United States Patent
Frament et al.

(10) Patent No.: US 12,502,982 B2
(45) Date of Patent: Dec. 23, 2025

(54) METHOD FOR CONTROLLING AN ELECTROMOTIVE DRIVE OF A MOTOR VEHICLE

(71) Applicants: Continental Automotive Technologies GmbH, Hannover (DE); Vitesco Technologies GmbH, Regensburg (DE)

(72) Inventors: Olivier Frament, Frankfurt am Main (DE); Jens Hoffmann, Frankfurt am Main (DE); Martin Semsch, Frankfurt am Main (DE); Matthias Töns, Munich (DE); Martin Spornraft, Munich (DE); Dragan Stojkovic, Munich (DE); Vincent Vahee, Munich (DE)

(73) Assignees: CONTINENTAL AUTOMOTIVE TECHNOLOGIES GMBH, Hannover (DE); SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 132 days.

(21) Appl. No.: 18/020,352

(22) PCT Filed: Aug. 6, 2021

(86) PCT No.: PCT/EP2021/071969
§ 371 (c)(1),
(2) Date: Feb. 8, 2023

(87) PCT Pub. No.: WO2022/033966
PCT Pub. Date: Feb. 17, 2022

(65) Prior Publication Data
US 2023/0286395 A1    Sep. 14, 2023

(30) Foreign Application Priority Data
Aug. 14, 2020    (DE) .................... 10 2020 210 382.8

(51) Int. Cl.
*B60L 15/20*    (2006.01)
*B60L 7/00*    (2006.01)
*B60L 58/12*    (2019.01)

(52) U.S. Cl.
CPC .......... *B60L 15/2009* (2013.01); *B60L 7/006* (2013.01); *B60L 58/12* (2019.02); *B60L 2240/545* (2013.01)

(58) Field of Classification Search
CPC ................. B60L 15/2009; B60L 58/12; B60L 2240/545; B60L 7/006; B60L 7/22
See application file for complete search history.

(56) References Cited

U.S. PATENT DOCUMENTS

| 4,479,080 | A |   | 10/1984 | Lambert |
| 5,788,597 | A | * | 8/1998 | Boll ........................ B60L 50/16 180/65.245 |

(Continued)

FOREIGN PATENT DOCUMENTS

| DE |     4446219 A1 | 6/1996 |
| DE | 102011111594 A1 | 2/2013 |

(Continued)

OTHER PUBLICATIONS

Japanese Notice of Reasons for Refusal for Japanese Application No. 2022-579775, dated Nov. 29, 2023 with translation, 9 pages.

(Continued)

*Primary Examiner* — David Phantana-angkool
(74) *Attorney, Agent, or Firm* — Buchanan Ingersoll & Rooney PC

(57) ABSTRACT

A method for controlling an electromotive drive of a motor vehicle. At least one of the motor vehicle wheels can be driven by an electric motor of the electromotive drive and the electromotive drive has at least one energy source for the electric motor. The method includes: identifying a request (Continued)

for applying a deceleration torque to the vehicle wheel, identifying status of the electromotive drive, selecting an operating mode of the electric motor according to the identified status, and controlling the electric motor in the selected operating mode for applying the deceleration torque. In a first operating mode, the electric motor is controlled such that the rotational energy of the vehicle wheel is converted at a first efficiency into electrical energy. In a second operating mode, the electric motor is controlled such that the rotational energy of the vehicle wheel is converted at a second efficiency into electrical energy.

18 Claims, 6 Drawing Sheets

(56) References Cited

U.S. PATENT DOCUMENTS

| | | | | |
|---|---|---|---|---|
| 7,096,985 | B2* | 8/2006 | Charaudeau | B60L 7/14 |
| | | | | 180/65.245 |
| 8,337,357 | B2* | 12/2012 | Jerwick | B60W 10/06 |
| | | | | 477/3 |
| 8,634,987 | B2* | 1/2014 | Seta | B60L 3/0038 |
| | | | | 477/92 |
| 9,242,565 | B2 | 1/2016 | Kleickmann et al. | |
| 9,641,106 | B2 | 5/2017 | Ota et al. | |
| 9,827,855 | B2 | 11/2017 | Iida et al. | |
| 10,392,018 | B1 | 8/2019 | Rhodes et al. | |
| 10,411,532 | B2* | 9/2019 | Lee | H02K 16/04 |
| 11,273,811 | B2* | 3/2022 | Books | B60T 8/3255 |
| 11,575,283 | B2* | 2/2023 | Fatemi | H02K 1/16 |
| 11,833,928 | B2* | 12/2023 | Miller | B60L 58/12 |
| 12,054,973 | B2* | 8/2024 | Holbein | E05B 83/24 |
| 2002/0096886 | A1* | 7/2002 | Schmitz | B60K 6/46 |
| | | | | 290/40 C |
| 2009/0145673 | A1* | 6/2009 | Soliman | B60K 6/442 |
| | | | | 701/22 |
| 2015/0171674 | A1* | 6/2015 | Lee | H02K 29/00 |
| | | | | 310/46 |
| 2015/0239474 | A1 | 8/2015 | Nakamura | |
| 2016/0190820 | A1* | 6/2016 | Chae | H01M 10/613 |
| | | | | 320/134 |
| 2016/0311423 | A1* | 10/2016 | Storm | B60L 50/40 |
| 2017/0074130 | A1 | 3/2017 | Leone et al. | |
| 2017/0257055 | A1 | 9/2017 | Kitaori et al. | |
| 2018/0170186 | A1* | 6/2018 | Yang | B60L 3/0061 |
| 2025/0084675 | A1* | 3/2025 | Pettengill | E05B 83/243 |

FOREIGN PATENT DOCUMENTS

| | | |
|---|---|---|
| DE | 102019125877 A1 | 4/2020 |
| JP | 05252606 A | 9/1993 |
| JP | H06-284509 A | 10/1994 |
| JP | 2007-253715 A | 10/2007 |
| JP | 2009166720 A | 7/2009 |
| JP | 2010080782 A | 4/2010 |
| JP | 2012005179 A | 1/2012 |
| JP | 2013099081 A | 5/2013 |
| JP | 2015027832 A | 2/2015 |
| JP | 2015133801 A | 7/2015 |
| JP | 2015-162933 A | 9/2015 |
| JP | 2015162947 A | 9/2015 |
| JP | 2017041926 A | 2/2017 |
| JP | 2017-077808 A | 4/2017 |
| JP | 2017093048 A | 5/2017 |
| JP | 2017131007 A | 7/2017 |
| JP | 2017-158389 A | 9/2017 |
| JP | 2019083660 A | 5/2019 |

OTHER PUBLICATIONS

International Search Report and Written Opinion for International Application No. PCT/EP2021/071969, dated Nov. 12, 2021, with partial translation, 8 pages.

German Search Report for German Application No. 10 2020 210 382.8, dated May 18, 2021, with translation, 10 pages.

Office Action (Notice of Grounds for Rejection) issued Oct. 21, 2024, by the Korean Intellectual Property Office in corresponding Korean Patent Application No. 10-2023-7001470 and an English translation of the Office Action. (14 pages).

Office Action (Notice of Reasons for Refusal) issued Jul. 31, 2024, by the Japan Patent Office in corresponding Japanese Patent Application No. 2022-579775 and an English translation of the Office Action. (11 pages).

* cited by examiner

METHOD FOR CONTROLLING AN ELECTROMOTIVE DRIVE OF A MOTOR VEHICLE

CROSS REFERENCE TO RELATED APPLICATIONS

This application is the U.S. National Phase Application of PCT International Application No. PCT/EP2021/071969, filed Aug. 6, 2021, which claims priority to German Patent Application No. 10 2020 210 382.8, filed Aug. 14, 2020, the contents of such applications being incorporated by reference herein.

FIELD OF THE INVENTION

The invention relates to a method for controlling an electromotive drive of a motor vehicle and to a corresponding electromotive drive.

BACKGROUND OF THE INVENTION

Mechanical friction brakes of motor vehicles have now reached a satisfactory level in terms of their reliability, thanks in part to the use of known and proven technology in a well-defined environment. However, friction brakes still have disadvantages. They contribute a not inconsiderable portion to the total mass of a vehicle, with a large portion of the mass contributed by the friction brakes being unsprung masses. A large portion of these unsprung masses is due to the fact that the brakes also have to be dimensioned for long braking processes for maintaining a speed of a potentially very long downhill drive. An example of this would be the descent from the Großglockner at a constant speed. For this reason, friction brakes also require a not inconsiderable amount of installation space in the vehicle.

The energy absorbed by the friction brake during deceleration by means of a friction brake cannot be recovered. Rather, the energy is given off to the surrounding area in the form of heat. This in turn leads to a waste of energy and particulate pollution of the environment due to abrasion material from the brake components, this abrasion material likewise being released into the environment. For example, in a vehicle with a mass of 1600 kg on an 8% gradient, friction brakes must absorb approximately 14 kW of mechanical power and emit it as heat to maintain a speed of 40 km/h.

In addition to decelerating a vehicle by means of friction brakes, it is also known from the prior art that vehicles can also be decelerated with the aid of the drive train. The deceleration of the vehicle with simultaneous recuperation of the kinetic energy of the vehicle should be mentioned here in particular for an electromotive drive train of a vehicle. Again analogously to the example mentioned above, it is quite realistic that when driving downhill like this, the necessary 14 kW deceleration power can be achieved simply by appropriate actuation of the electromotive drive train, where, assuming correspondingly efficient control of the drive, about 12 kW electrical power can be fed back to a battery of the drive.

However, deceleration of the vehicle by means of the drive train according to the prior art usually lacks the reliability given for friction brakes. For example, the problem arises that energy can no longer be recuperated if the absorption capacity of a battery of the electromotive drive is insufficient, so that this possibility for decelerating the vehicle is no longer available. The same applies if, for example, the connection between the electromotive drive and the battery for feeding back electrical energy is interrupted, for example due to a defect. Overall, a large number of components of the vehicle are involved in such a deceleration by means of recuperation, so that even if one of the components fails, deceleration by means of recuperation is no longer possible.

SUMMARY OF THE INVENTION

In contrast, an aspect of the present invention is a method for controlling an electromotive drive and a corresponding electromotive drive which overcome the abovementioned disadvantages of the prior art.

In a first aspect, the invention relates to a method for controlling an electromotive drive of a motor vehicle using a controller, wherein at least one vehicle wheel of the motor vehicle can be driven by an electric motor of the electromotive drive and wherein the electromotive drive has at least one energy source for the electric motor. The method comprises the execution of the following steps by the controller:

determining a request for applying a deceleration torque to the vehicle wheel, determining items of status information of the electromotive drive, selecting an operating mode of the electric motor from at least two possible operating modes of the electric motor depending on the determined items of status information, and actuating the electric motor in the selected operating mode for applying the deceleration torque to the vehicle wheel.

Here, in a first operating mode from amongst the possible operating modes of the electric motor, the electric motor is actuated such that the rotational energy of the vehicle wheel is converted into electrical energy with a first efficiency. However, in a second operating mode from amongst the possible operating modes of the electric motor, the electric motor is actuated such that the rotational energy of the vehicle wheel is converted into electrical energy with a second efficiency, wherein the second efficiency is lower than the first efficiency.

An aspect of the invention is based on the idea of using the electric motor, for example in the event of insufficient capacity of the energy source, to generate a deceleration torque on a vehicle wheel in a recuperation mode such that only a very small proportion of the rotational energy of the vehicle wheel in question is converted into electrical energy. Due to the reduced efficiency of the recuperation operation in the second operating mode, a large portion of the rotational energy is to be converted into heat which accumulates in the electric motor and its peripherals, in particular its power electronics system, and can be dissipated by existing cooling of the electric motor. Therefore, a permanent deceleration torque can be provided by the electric motor without recourse to the battery, this permanent deceleration torque being limited substantially by the cooling capacity of the cooling of the electric motor.

At the same time, the method described can be implemented solely from the electromotive drive, so that no interactions with other systems of the vehicle are necessary. Such interactions are usually a potential fault source that could jeopardize the reliability of such an approach. The reliable provision of a defined deceleration torque by the electromotive drive in turn makes it possible to dimension the vehicle's friction brakes to be smaller since the electric motor can reliably contribute a certain proportion of a deceleration power.

Here, a "deceleration torque" is to be understood very generally as a torque which is directed in the opposite direction to a direction of rotation of a vehicle wheel, that is would lead to the rotation of the vehicle wheel slowing down in the absence of other forces.

However, the application of such a deceleration torque to a vehicle wheel is not to be equated with a deceleration of the vehicle per se. Therefore, other forces acting on the vehicle, such as a downhill slope force for example, can lead to the speed of a vehicle not being reduced in spite of the deceleration torque caused by the electric motor, but possibly even being increased.

In this case, a request to apply a deceleration torque to a vehicle wheel can be triggered, for example, by operation of a brake pedal by a vehicle driver. Furthermore, it is also possible for such a request to be triggered by a driving function of the vehicle, such as by a cruise control system or a function for controlled downhill driving (Hill Descent Control) for example.

Even though only a vehicle wheel which is driven by an electric motor that draws its energy from an energy source is described in the method, the method according to an aspect of the invention can be transferred to any desired configuration of vehicle wheels, electric motors and energy sources. Therefore, the method can also be used in a motor vehicle in which each vehicle wheel is driven by an electric motor, with the motors being supplied with energy from a plurality of energy sources. Here, provision can be made, in particular, for the electric motors assigned to a front axle of a vehicle to be connected to a first energy source, while the electric motors assigned to a rear axle of the vehicle are connected to a second energy source. In this case, in the context of the method, the situation may also occur, in particular, for the electric motors of the front axle to be operated in a different operating mode than the electric motors of the rear axle.

Here, an "electric motor" is generally understood to mean any type of electric motor that is suitable for using electrical energy to cause a torque on a vehicle wheel and vice versa, by way of appropriate actuation, to convert a torque taken from a vehicle wheel into electrical energy. An "energy source" for the electric motor can be a battery, for example.

An "operating mode" within the meaning of an aspect of the invention, or actuation of an electric motor in such an operating mode, is to be understood here as meaning targeted actuation of the electric motor with parameters specified by the selected operating mode. Using the example of a three-phase brushless DC motor, an operating mode can be used to specify, for example, how and when the voltages of the commutation blocks are switched. The course of the voltages in the commutation blocks, that is to say the specific signal form of the voltages, can also be specified by the operating mode. Here, the parameters of the operating modes are selected such that the resulting efficiencies of the electric motor during the conversion of rotational energy of the vehicle wheel into electrical energy already differ between the operating modes simply because of the selected parameters. Different efficiencies of the electric motor, which result, for example, from external, uncontrolled influences, such as an operating temperature of the electric motor, are not to be understood as different operating modes within the meaning of an aspect of the invention. Targeted setting of an operating temperature of the electric motor to influence the efficiency, on the other hand, can be interpreted as an operating mode within the meaning of an aspect of the invention.

According to a preferred embodiment, the electrical energy is supplied here to the energy source in the first operating mode. This is therefore recuperation of rotational energy of the vehicle wheel, with which the energy source, in particular a battery, is recharged.

As already explained above, the operating mode of the electric motor is selected depending on previously determined items of status information of the electromotive drive. According to a preferred embodiment, the items of status information here comprise at least one state of charge of the energy source and/or a temperature of the energy source and/or a temperature of the electric motor and/or a temperature of other components of the electromotive drive. The other components of the electromotive drive can be, for example, the power electronics system of the drive, in particular an inverter for converting a DC voltage provided by the energy source into an AC voltage required for the operation of the electric motor. In particular, provision can be made for the electric motor to preferably be operated in the first operating mode when the state of charge of the energy source does not correspond to a fully charged energy source, so that the largest possible portion of the rotational energy taken from the vehicle wheel is converted into electrical energy. Account is preferably also taken here of whether the energy source is suitable for receiving electrical energy based on its current temperature.

The items of status information can further also identify fault states of individual components of the electromotive drive. For example, provision can also be made for the electric motor to be operated in the second operating mode if it has been established that the connection between the electric motor and the energy source is defective or interrupted, that is it is not possible to feed electrical energy back into the energy source.

Conversely, when selecting the operating modes, account is also taken of whether the electric motor is able, for example due to its current temperature, to dissipate rotational energy of the vehicle wheel as thermal energy. Equally, the temperatures of other components of the electromotive drive, in particular the power electronics system of the electric motor, are also preferably taken into account here, these likewise limiting operation of the electric motor in the second operating mode in which the electric motor is used to dissipate thermal energy.

According to a further preferred embodiment, provision is further made for the second efficiency to be dependent on the state of charge and/or the temperature of the energy source. For example, provision can be made for the second operating mode to be used when the energy source is almost fully charged. In this case, recuperation of rotational energy of the vehicle wheel into the energy source is still useful, so that the second efficiency should not be too low. Provision can also be made here for the second efficiency to be scaled continuously with the current state of charge of the energy source, so that the second efficiency decreases continuously as the charge of the energy source increases. Furthermore, provision can also be made here for the lowest possible second efficiency to be set despite a slight discharge of the energy source, since electrical energy cannot be returned to the energy source due to a current temperature of the energy source.

According to a further embodiment, provision is further made for the first efficiency to be the highest possible efficiency for converting the rotational energy of the vehicle wheel into electrical energy and for the second efficiency to be the lowest possible efficiency for converting the rotational energy of the vehicle wheel into electrical energy using the electric motor.

According to a further embodiment, provision is further made for the motor vehicle to have at least one heating circuit, wherein heat generated during operation of the electric motor in the second operating mode is supplied to the heating circuit. The heating circuit can contain, for example, a heater of a passenger compartment of the motor vehicle, so that the heat generated by the electric motor when the vehicle is decelerating can be used to heat the passenger compartment.

In addition to operating the electric motor in one of the two operating modes described above, in which kinetic energy of the vehicle wheel is converted into electrical energy with different degrees of efficiency, provision is further made according to a further embodiment for the previously, in a third operating mode from amongst the possible operating modes of the electric motor, the electric motor to be actuated such that it applies the deceleration torque to the vehicle wheel using electrical energy provided by the energy source. Accordingly, the electric motor is actively energized so that it can cause a deceleration torque on the vehicle wheel. On the one hand, thermal energy occurs in the electric motor due to the active energization of the motor, while at the same time the rotational energy extracted from the vehicle wheel is produced as heat in the electric motor. This operation can be used, for example, when a large amount of heat is required despite only a slight deceleration request, for example to heat up the passenger compartment of the vehicle quickly, or to bring the electromotive drive to operating temperature. At the same time, the energy source is at least slightly discharged in this operating mode, so that a subsequent deceleration request can be executed in the first operating mode.

According to a further embodiment, provision is also made, when selecting the operating mode of the electric motor, for absorption capacities of other electrical consumers of the motor vehicle for absorbing electrical energy to be taken into account. For example, despite a fully charged energy source, operation of the electric motor in the first operating mode can be useful if the electrical energy generated in this way can be drawn by other electrical consumers of the motor vehicle. An air conditioning system or an electric heater, for example, can be mentioned here as an electrical consumer.

According to a preferred embodiment, provision is further made for the electric motor to be a brushless DC motor with a power electronics system for providing an operating voltage for the DC motor, wherein, for actuating the electric motor in the different operating modes, only actuation of the power electronics system is adapted to the selected operating mode.

In a further aspect, the invention relates to an electromotive drive for a motor vehicle having an electric motor, an energy source for the electric motor and a controller for the electric motor. Here, the controller is designed to determine a request for applying a deceleration torque to a vehicle wheel connected to the electric motor, to determine items of status information of the electromotive drive, to determine an operating mode of the electric motor from at least two possible operating modes of the electric motor depending on the determined items of status information, and to actuate the electric motor in the selected operating mode for applying the deceleration torque to the vehicle wheel. Here, in a first operating mode from amongst the possible operating modes of the electric motor, the electric motor is actuated such that the rotational energy of the vehicle wheel is converted into electrical energy with a first efficiency, and, in a second operating mode from amongst the possible operating modes of the electric motor, the electric motor is actuated such that the rotational energy of the vehicle wheel is converted into electrical energy with a second efficiency, wherein the second efficiency is lower than the first efficiency.

According to one embodiment, provision is made here for the electromotive drive to have at least one cooling circuit for cooling the electric motor, wherein heat generated during operation of the electric motor in the second operating mode is at least partially dissipated via the cooling circuit. The cooling circuit can in turn be designed here to emit heat absorbed in the electric motor to a heating circuit of the motor vehicle.

According to a preferred embodiment, provision is further made here for the cooling circuit to have a control arrangement for regulating a cooling capacity provided by the cooling circuit, wherein the control arrangement is actuated by the controller depending on the selected operating mode of the electric motor. For example, provision can be made, when the electric motor is operated in the second or third operating mode, for the cooling capacity of the cooling circuit to be automatically increased by appropriate actuation of elements such as circulation pumps or cooling compressors, so that the heat produced in the electric motor can be efficiently dissipated and overheating of the electric motor can be avoided.

BRIEF DESCRIPTION OF THE DRAWINGS

Preferred refinements of the invention will be explained in more detail below on the basis of the drawings, in which.

DETAILED DESCRIPTION OF THE PREFERRED EMBODIMENTS

In the following text, features that are similar or identical to each other are denoted by the same reference signs.

Figure 1:
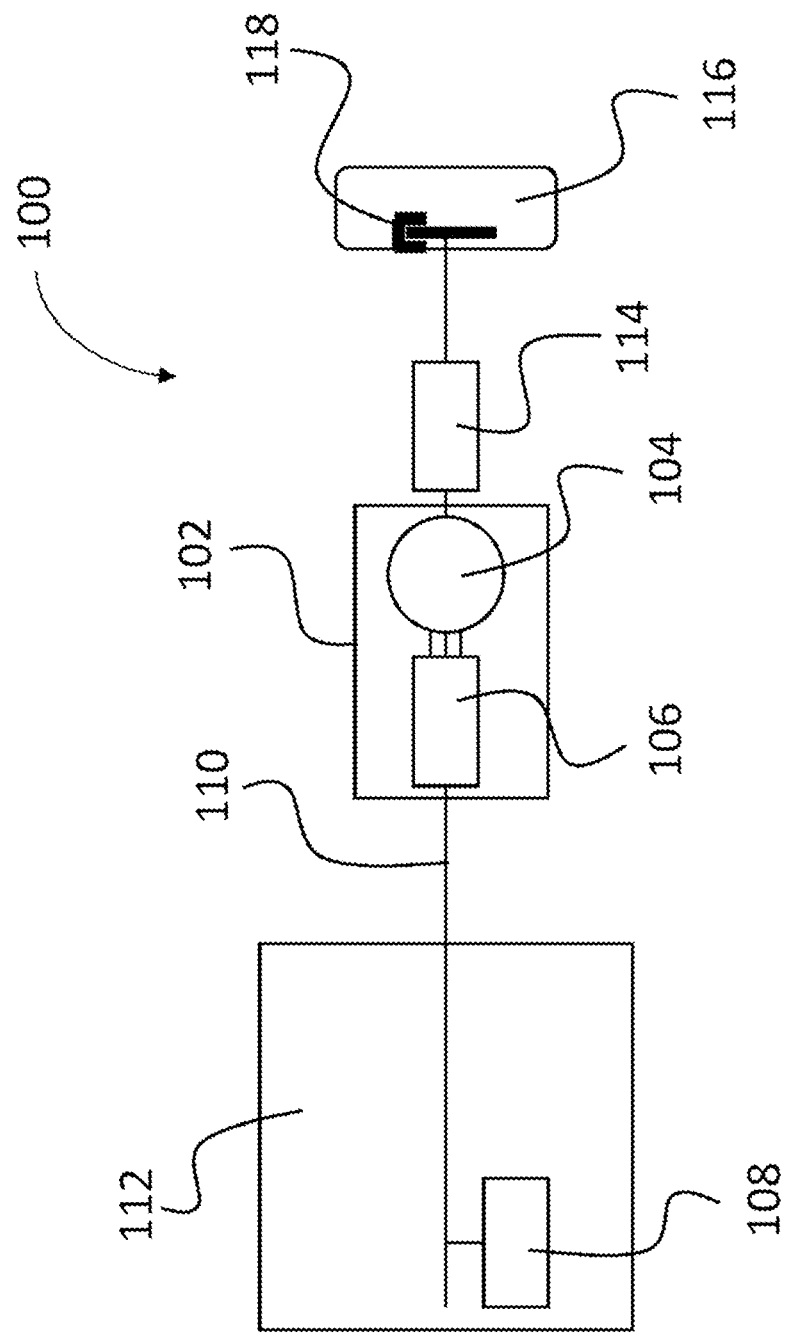
FIG. 1 shows a schematic illustration of an electromotive drive according to the prior art.

FIG. 1 shows a schematic illustration of an electromotive drive 100 according to the prior art. Here, the electromotive drive 100 has a drive unit 102 with an electric motor 104 and a controller 106 for the electric motor 104. The drive unit 102 and therefore the electric motor 104 are connected to an energy source 108, for example a battery, via a DC connection 110 for supplying electrical energy. In addition to the energy source 108, other electrical consumers 112 can also be connected to the drive unit 102 via the DC connection 110, this being only highly schematically indicated in FIG. 1.

The electric motor 104 is connected to a vehicle wheel 116 via a downstream transmission 114 such that the electric motor 104 can cause a torque on the vehicle wheel 116.

Furthermore, a friction brake 118 is arranged on the vehicle wheel 116, which is shown by way of example as a disk brake. With such a configuration, it is known from the prior art that by appropriately actuating the electric motor 104, an accelerating torque can be applied to the vehicle wheel 116 using electrical energy from the energy source 108, as can a decelerating torque, with the rotational energy of the vehicle wheel 116 preferably being converted into electrical energy which is supplied to the energy source 108.

In the prior art, there is usually a focus on actuating the electric motor as efficiently as possible, so that electrical energy from the energy source 108 is converted into kinetic energy of the vehicle wheel 116 with the highest possible degree of efficiency, and vice versa.

Figure 2:
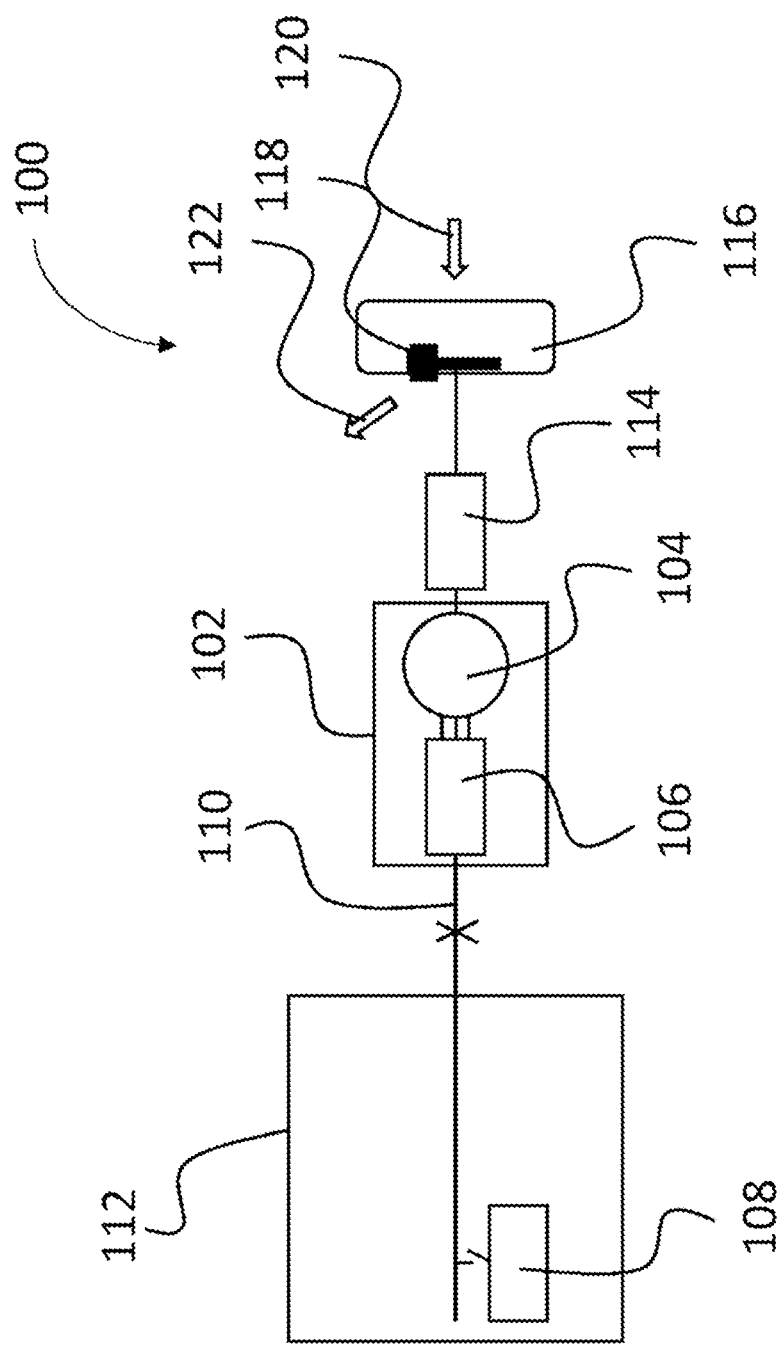
FIG. 2 shows a schematic illustration of different fault sources of an arrangement according to FIG. 1.

FIG. 2 now schematically shows which fault sources in the configuration described in FIG. 1 lead to such an electromotive drive according to the prior art generally not being able to permanently and reliably relieve the friction brakes of loading. A first fault source or a first problematic state arises when the energy source 108 is fully charged, that is recuperation of kinetic energy into the energy source 108 is no longer possible. A second fault source is an interruption in or malfunction of the DC connection 110, so that it is no longer possible to discharge electrical energy to the other electrical consumers 112 either. In both cases, all the kinetic energy 120 released when the vehicle wheel is decelerated would have to be absorbed by the friction brake 118 in the form of heat 122 and emitted into the surrounding area.

In order to solve this problem and to ensure reliable provision of a deceleration torque by the electromotive drive 100 even in the event of malfunctions of individual components, such as the energy source 108 or the DC connection 110, provision is made according to an aspect of the invention to operate the electric motor 104 depending on the states of the individual components of the electromotive drive 100 in order to generate a deceleration torque on the vehicle wheel 116 in different operating modes.

Figure 3:
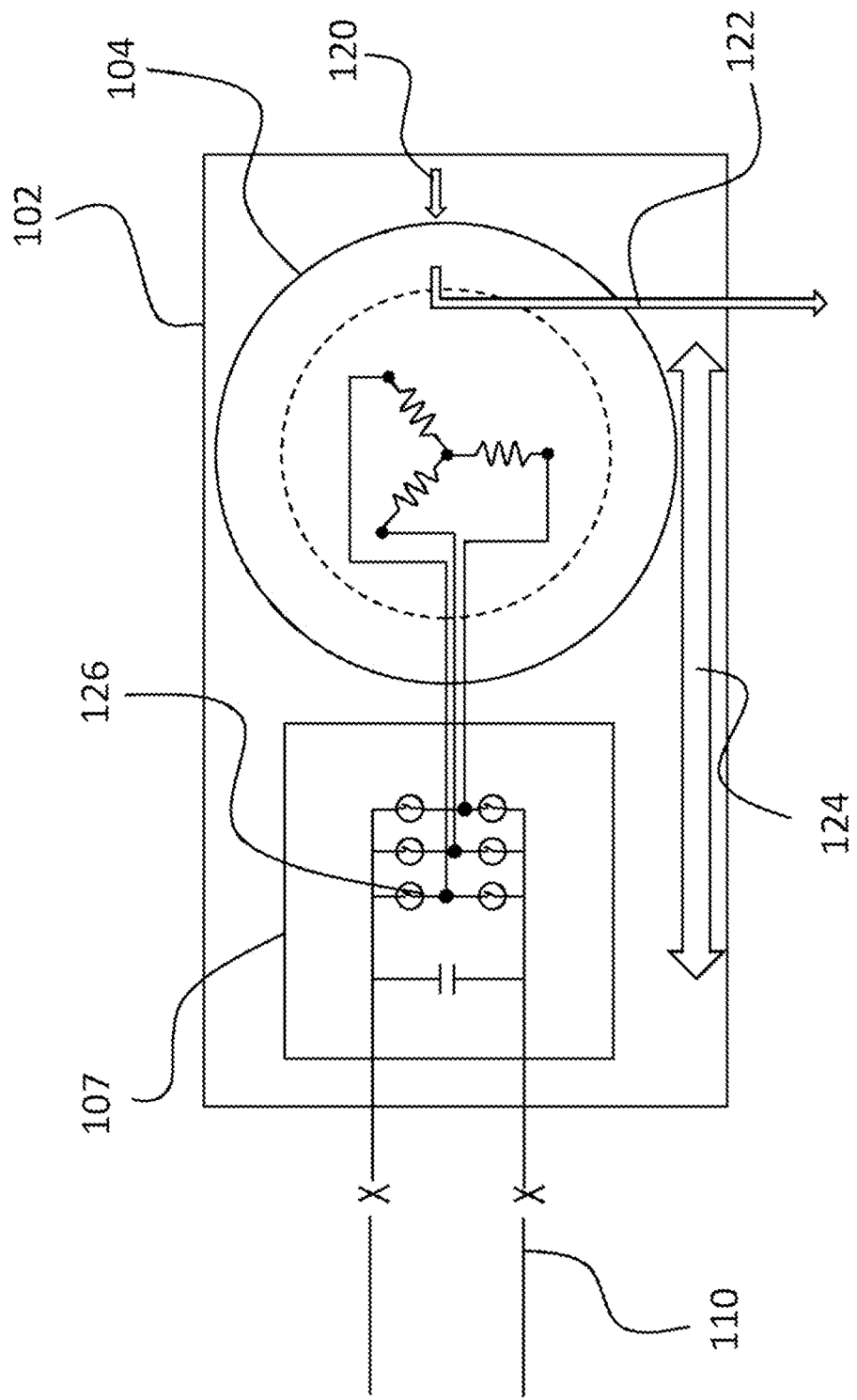
FIG. 3 shows a schematic illustration of an electric motor in the second operating mode.

An electric motor 104 is shown as an example of this in FIG. 3. As indicated on the left-hand side of the figure, it is not possible to feed back electrical energy from the drive unit 102 via the DC connection 110 to the energy source 108 in the situation shown. This can be the case, for example, with a fully charged energy source 108 or a defect in the DC connection 110. In this case, provision is made according to an aspect of the invention for the electric motor 104 to be operated by appropriate actuation of the power electronics system 107 such that although it continues to convert the rotational energy 120 of the vehicle wheel 116 into electrical energy in order to generate a deceleration torque on the vehicle wheel 116, it does so with the lowest possible efficiency.

The consequence of this is that only a very small portion of the rotational energy 120 of the vehicle wheel 116 is converted into electrical energy, with the currents 124 that arise in this way preferably being completely converted into heat by the electric motor 104 and the power electronics 107, or the inverter 126 connected upstream of the electric motor 104. By contrast, the vast majority of the rotational energy 120 is converted into heat 122 which is produced in the electric motor 104 and can be dissipated by cooling the electric motor 104.

However, as long as electrical energy can be fed back into the energy source 108 via the DC connection 110, the electric motor is operated in a first operating mode for decelerating the vehicle wheel 116 by appropriate actuation of the power electronics system 107 such that the rotational energy 120 of the vehicle wheel 116 is converted into electrical energy with the greatest possible efficiency and this electrical energy is then supplied to the energy source 108. Here, the operating parameters for the electric motor 104 in this operating mode are designed such that as little heat as possible is generated in the electric motor 104.

Figure 4:
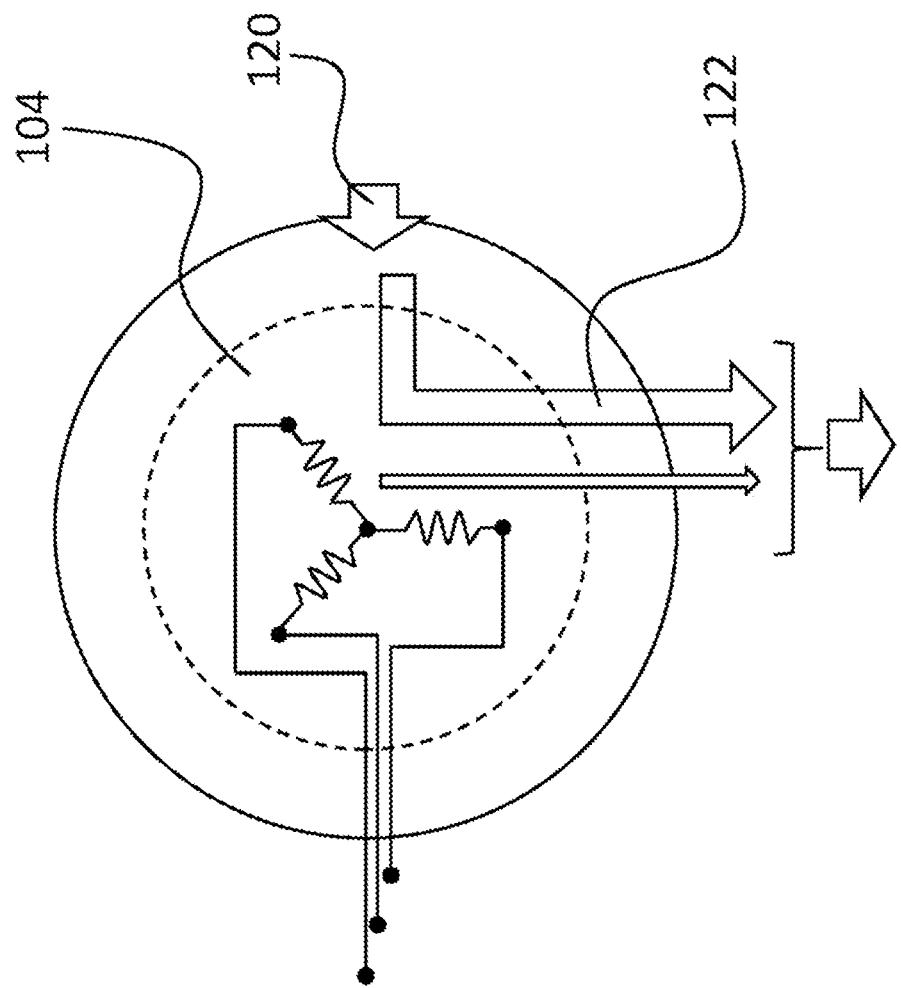
FIG. 4 shows a schematic illustration of an electric motor in the third operating mode.

A third operating mode for the electric motor 104 is indicated schematically in FIG. 4, which third operating mode can be used, for example, when the energy source is fully charged, the DC connection 110 is intact and the electric motor 104 is still comparatively cold. In this case, in order to generate the deceleration torque, the electric motor is actively energized by appropriate actuation of the power electronics system 107 by the controller 106 in a targeted manner such that a deceleration torque is applied to the vehicle wheel 116 using electrical energy. As a result, both the electrical energy used and the rotational energy 120 of the vehicle wheel 116 are produced as thermal energy 122 in the electric motor 104 and this thermal energy can be dissipated by way of appropriate cooling.

Figure 5:
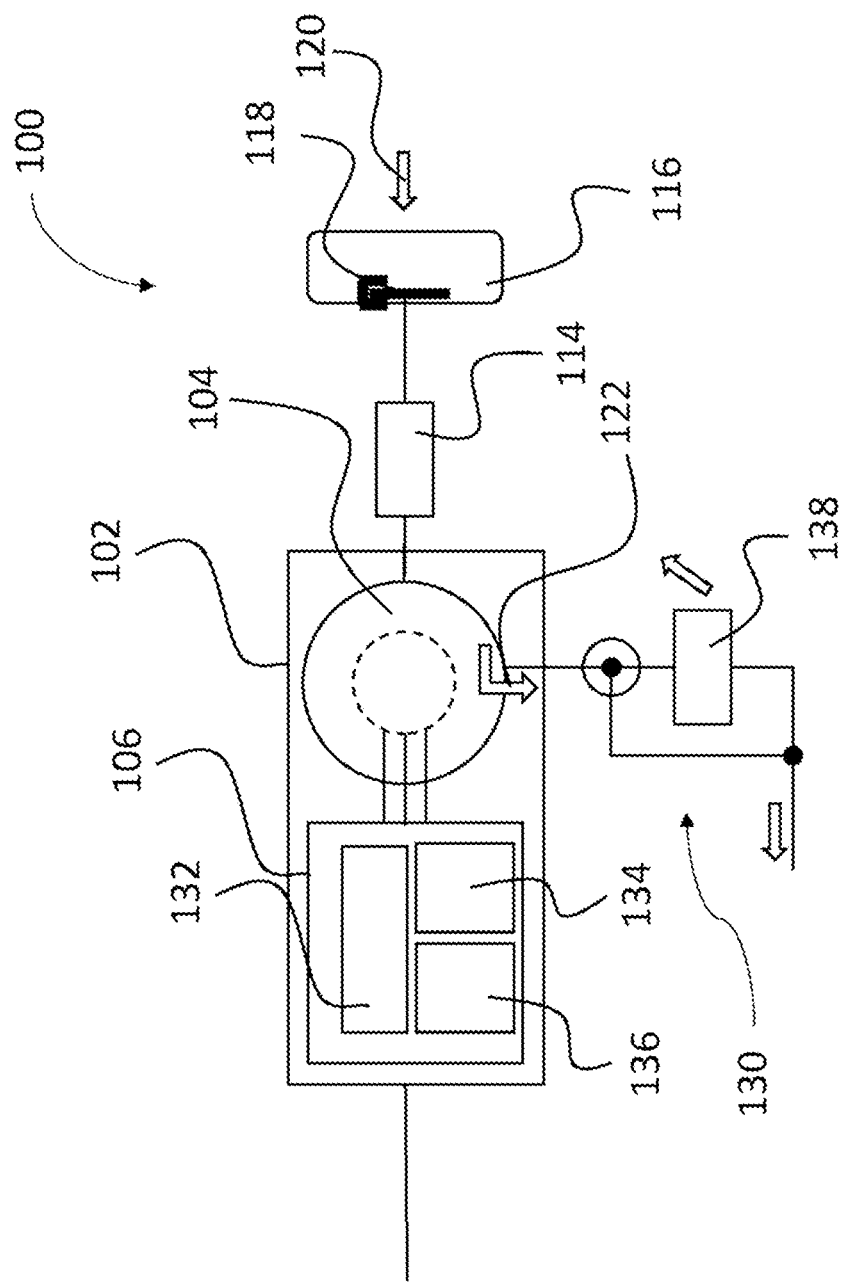
FIG. 5 shows a schematic illustration of an exemplary electromotive drive having a heating circuit.

FIG. 5 shows a schematic illustration of an exemplary electromotive drive 100, wherein the electromotive drive 100 is connected to a heating circuit 130 of a motor vehicle. Here, the controller 106 of the drive unit 102 has a control logic system 132 which switches over between different operating modes of the electric motor 104 for generating a deceleration torque depending on the situation. Here, a first operating mode 134 is designed by appropriate adjustment of the operating parameters of the electric motor 104, that is in particular using an appropriate control logic system of the associated power electronics system, so that the electric motor 104 converts the kinetic energy 120 of the vehicle wheel 116 into electrical energy with the highest possible efficiency in order to generate a deceleration torque and this electrical energy is then supplied to the energy source via the DC connection 110. This first operating mode 134 is used, for example, when the energy source is not fully charged and the DC connection 110 is fully functional.

In a second operating mode 136, on the other hand, provision is made by appropriate adjustment of the operating parameters of the electric motor 104 for the electric motor 104 to convert the kinetic energy of the vehicle wheel 116 into electrical energy in order to generate a deceleration torque with the lowest possible efficiency. The heat produced in the process is dissipated to the heating circuit 130 and can be used, for example, by means of a corresponding radiator 138 in order to heat the passenger compartment of the motor vehicle.

Figure 6:
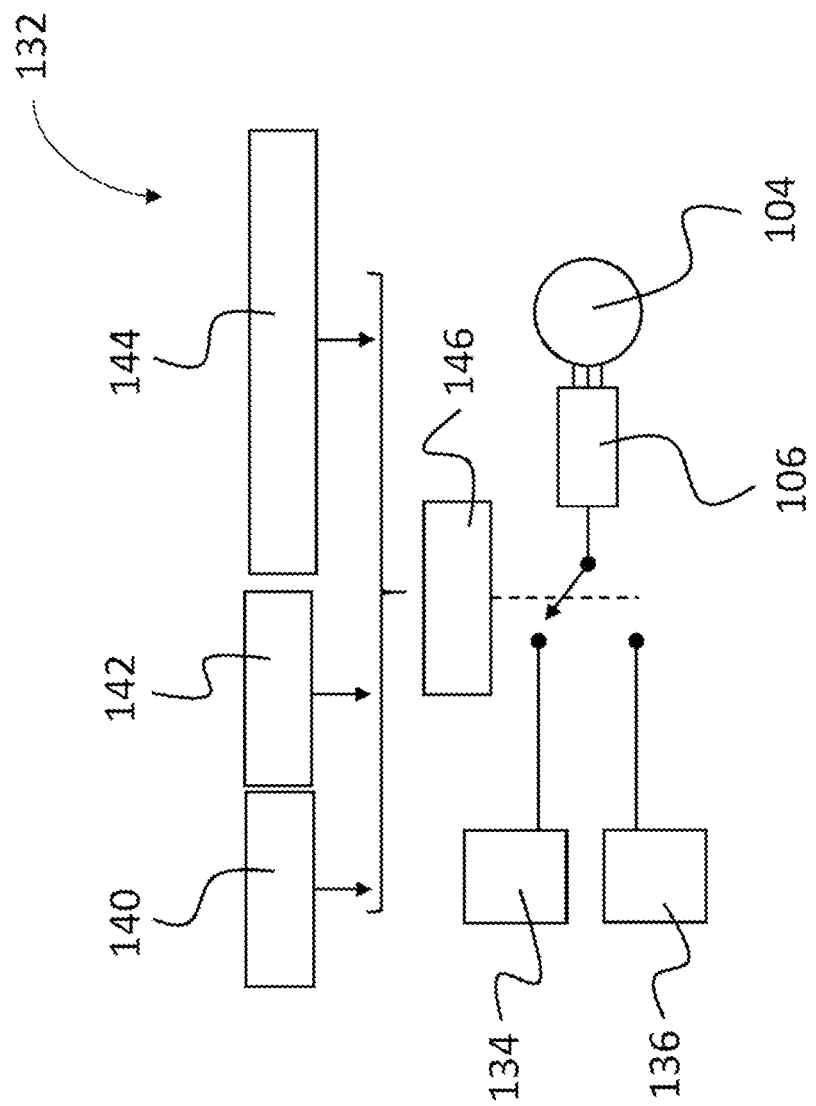
FIG. 6 shows a schematic illustration of an exemplary control logic system for an electromotive drive.

FIG. 6 shows a schematic illustration of a control logic system 132 for an electromotive drive 100, as has been described above. Here, the control logic system 132 is initially designed to determine items of status information 140, 142 and 144 of the electromotive drive. The items of status information are, for example, the status information 140 for the functionality of the DC connection 110, the status information 142 for the readiness of the energy source 108 to receive electrical energy, which readiness is influenced, for example, by the state of charge and the temperature of the energy source 108, or the readiness of other electrical consumers 112 to receive electrical energy.

The items of status information determined in this way are supplied to a decision logic system 146 which, by looking at the determined items of status information 140, 142, 144 together, determines whether an incoming request for the electromotive drive 102 to apply a deceleration torque to a vehicle wheel 116 should be implemented in a first operating mode of the electric motor 104 or a second operating mode of the electric motor 104, as has been described above.

Depending on the output of this decision logic system 146, the operating parameters of the electric motor 104 according to the first or the second operating mode are then used by the controller when actuating the corresponding power electronics system 106, so that the electric motor 104 converts the rotational energy of the vehicle wheel 116 into electrical energy either with the highest possible or with the lowest possible efficiency.

The invention claimed is:

1. A method for controlling an electromotive drive of a motor vehicle using a controller, wherein at least one vehicle wheel of the motor vehicle can be driven by an electric motor of the electromotive drive and wherein the electromotive drive has at least one energy source for the electric motor, wherein the method comprises the execution of the following steps by the controller:
determining a request for applying a deceleration torque to the vehicle wheel;
determining items of status information of the electromotive drive;
selecting an operating mode of the electric motor from at least two possible operating modes of the electric motor depending on the determined items of status information,
wherein each of the at least two possible operating modes specify targeted parameters of the electric motor; and
actuating the electric motor in the selected operating mode by applying specified targeted parameters to the electric motor for applying the deceleration torque to the vehicle wheel,
wherein, in a first operating mode from amongst the possible operating modes of the electric motor, the electric motor is actuated such that the rotational energy of the vehicle wheel is converted into electrical energy with a first efficiency,
wherein, in a second operating mode from amongst the possible operating modes of the electric motor, the electric motor is actuated such that the rotational energy of the vehicle wheel is converted into electrical energy with a second efficiency,
wherein the second efficiency is lower than the first efficiency, and
wherein, when selecting the operating mode of the electric motor, absorption capacities of other electrical consumers of the motor vehicle for absorbing electrical energy are taken into account.

2. The method as claimed in claim 1, wherein the electrical energy is supplied to the energy source in the first operating mode.

3. The method as claimed in claim 1, wherein the items of status information comprise at least one of state of charge of the energy source and/or a temperature of the energy source and/or a temperature of the electric motor and/or a temperature of other components of the electromotive drive.

4. The method as claimed in claim 3, wherein the second efficiency is dependent on the state of charge and/or the temperature of the energy source.

5. The method as claimed in claim 1, wherein the first efficiency is the highest possible efficiency for converting the rotational energy of the vehicle wheel into electrical energy and the second efficiency is the lowest possible efficiency for converting the rotational energy of the vehicle wheel into electrical energy using the electric motor.

6. The method as claimed in claim 1, wherein the motor vehicle has at least one heating circuit, wherein heat generated during operation of the electric motor in the second operating mode is supplied to the heating circuit.

7. The method as claimed in claim 1, wherein, in a third operating mode from amongst the possible operating modes of the electric motor, the electric motor is actuated such that, using electrical energy provided by the energy source, it applies the deceleration torque to the vehicle wheel.

8. The method as claimed in claim 1, wherein the electric motor is a brushless DC motor with a power electronics system for providing an operating voltage for the DC motor, wherein, for actuating the electric motor in the different operating modes, only actuation of the power electronics system is adapted to the selected operating mode.

9. The method as claimed in claim 2, wherein the items of status information comprise at least one state of charge of the energy source and/or a temperature of the energy source and/or a temperature of the electric motor and/or a temperature of other components of the electromotive drive.

10. The method as claimed in claim 9, wherein the second efficiency is dependent on the state of charge and/or the temperature of the energy source.

11. The method as claimed in claim 1, wherein the electromotive drive has at least one cooling circuit for cooling the single electric motor, and wherein heat generated during operation of the single electric motor in the second operating mode is at least partially dissipated via the cooling circuit.

12. The method as claimed in claim 1, wherein actuating the electric motor according to the specified targeted parameters for the selected operating mode includes switching voltages of one or more commutation blocks or setting the signal form of the voltages.

13. The method as claimed in claim 1, wherein the specified targeted parameters of the at least two possible operating modes are designed such that the efficiencies of the electric motor for each of the at least two operating modes differ between the at least two possible operating modes based on the specified targeted parameters.

14. An electromotive drive for a motor vehicle having an electric motor, an energy source for the electric motor and a controller for the electric motor, wherein the controller is designed to:
determine a request for applying a deceleration torque to a vehicle wheel connected to the electric motor,
determine items of status information of the electromotive drive,
determine an operating mode of the electric motor from at least two possible operating modes of the electric motor depending on the determined items of status information, wherein each of the at least two possible operating modes specify targeted parameters of the electric motor, and
actuate the electric motor in the selected operating mode by applying specified targeted parameters to the electric motor for applying the deceleration torque to the vehicle wheel,
wherein, in a first operating mode from amongst the possible operating modes of the electric motor, the electric motor is actuated such that the rotational energy of the vehicle wheel is converted into electrical energy with a first efficiency,
wherein, in a second operating mode from amongst the possible operating modes of the electric motor, the electric motor is actuated such that the rotational energy of the vehicle wheel is converted into electrical energy with a second efficiency, wherein the second efficiency is lower than the first efficiency, and wherein, when selecting the operating mode of the electric motor, absorption capacities of other electrical consumers of the motor vehicle for absorbing electrical energy are taken into account.

15. The electromotive drive as claimed in claim 14, wherein the specified targeted parameters of the at least two possible operating modes are designed such that the efficiencies of the electric motor for each of the at least two operating modes differ between the at least two possible operating modes based on the specified targeted parameters.

16. The electromotive drive as claimed in claim 14, wherein actuating the electric motor according to the specified targeted parameters for the selected operating mode includes switching voltages of one or more commutation blocks or setting the signal form of the voltages.

17. The electromotive drive as claimed in claim 14, wherein the electromotive drive has at least one cooling circuit for cooling the electric motor, wherein heat generated during operation of the electric motor in the second operating mode is at least partially dissipated via the cooling circuit.

18. The electromotive drive as claimed in claim 17, wherein the cooling circuit has a control arrangement for regulating a cooling capacity provided by the cooling circuit, wherein the control arrangement is actuated by the controller depending on the selected operating mode of the electric motor.

\* \* \* \* \*